US010559061B2

(12) United States Patent
Asente et al.

(10) Patent No.: US 10,559,061 B2
(45) Date of Patent: Feb. 11, 2020

(54) COMPUTERIZED GENERATION OF ORNAMENTAL DESIGNS BY PLACING INSTANCES OF SIMPLE SHAPES IN ACCORDANCE WITH A DIRECTION GUIDE

(71) Applicant: Adobe Inc., San Jose, CA (US)

(72) Inventors: Paul Asente, Redwood City, CA (US); Craig Kaplan, Waterloo (CA); Radomir Mech, San Jose, CA (US); Reza Adhitya Saputra, Waterloo (CA)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/589,943

(22) Filed: May 8, 2017

(65) Prior Publication Data
US 2018/0322612 A1 Nov. 8, 2018

(51) Int. Cl.
*G06T 3/40* (2006.01)
*G06T 3/00* (2006.01)

(52) U.S. Cl.
CPC .......... *G06T 3/0081* (2013.01); *G06T 3/0012* (2013.01); *G06T 3/403* (2013.01); *G06T 3/4038* (2013.01); *G06T 2200/32* (2013.01); *G06T 2210/44* (2013.01)

(58) Field of Classification Search
CPC ........ G06T 11/60; G06T 11/001; G06T 11/20; G06T 11/203; G06F 3/04845; G06K 9/42; G06K 9/44
See application file for complete search history.

(56) References Cited

U.S. PATENT DOCUMENTS 7,495,670 B1 2/2009 Manzari

FOREIGN PATENT DOCUMENTS

GB 2492225 A 12/2012

OTHER PUBLICATIONS

Chen, Guoning et al., "Interactive procedural street modeling", ACM transactions on graphics (TOG), vol. 27, No. 3, ACM, 2008.*
S. Hiller, H. Hellwig, O. Deussen, Beyond Stippling—Methods for Distributing Objections on the Plane, EUROGRPAHICS 2003, v.22 (abstract).
Paul Guerrero, Gilbert Bernstein, Wilmot Li, and Niloy J. Mitra. 2016. PATEX: exploring pattern variations. ACM Trans. Graph. 35, 4, Article 48 (Jul. 2016), 13 pages. DOI: https://doi.org/10.1145/2897824.2925950.
(Continued)

*Primary Examiner* — Diane M Wills
(74) *Attorney, Agent, or Firm* — Kilpatrick Townsend & Stockton LLP

(57) ABSTRACT

Systems and methods for computerized drawing of ornamental designs consisting of placed instances of simple shapes. The shapes, called elements, are selected from a small library of templates. The elements are deformed to flow along a direction field interpolated from user-supplied strokes, giving a sense of visual flow to the final composition, and constrained to lie within a container region. In an implementation, a vector field is computed based on user strokes. Streamlines that conform to the vector field are constructed, and an element is placed over each streamline. The shape of the elements may be modified such as by bending, stretching or enlarging to reduce spacing between elements and to minimize variations in spacing to improve aesthetic appearance.

20 Claims, 10 Drawing Sheets

(56) References Cited

OTHER PUBLICATIONS

Weikai Chen, Xiaolong Zhang, Shiqing Xin, Yang Xia, Sylvain Lefebvre, and Wenping Wang. 2016. Synthesis of filigrees for digital fabrication. ACM Trans. Graph. 35, 4, Article 98 (Jul. 2016), 13 pages. DOI: https://doi.org/10.1145/2897824.2925911.

Jonas Zehnder, Stelian Coros, and Bernhard Thomaszewski. 2016. Designing structurally-sound ornamental curve networks. ACM Trans. Graph. 35, 4, Article 99 (Jul. 2016), 10 pages. DOI: https://doi.org/10.1145/2897824.2925888.

Changqing Zou, Junjie Cao, Warunika Ranaweera, Ibraheem Alhashim, Ping Tan, Alla Sheffer, and Hao Zhang. 2016. Legible compact calligrams. ACM Trans. Graph. 35, 4, Article 122 (Jul. 2016), 12 pages. DOI: https://doi.org/10.1145/2897824.2925887.

Ling Xu and David Mould. 2015. Procedural Tree Modeling with Guiding Vectors. Comput. Graph. Forum 34, 7 (Oct. 2015), 47-56. DOI=http://dx.doi.org/10.1111/cgf.12744.

Jingwan Lu, Connelly Barnes, Connie Wan, Paul Asente, Radomir Mech, and Adam Finkelstein. 2014. DecoBrush: drawing structured decorative patterns by example. ACM Trans. Graph. 33, 4, Article 90 (Jul. 2014), 9 pages. DOI=http://dx.doi.org/10.1145/2601097.2601190.

Zainab AlMeraj, Craig S. Kaplan, and Paul Asente. 2013. Patch-based geometric texture synthesis. In Proceedings of the Symposium on Computational Aesthetics (CAE '13), Stephen N. Spencer (Ed.). ACM, New York, NY, USA, 15-19. DOI=http://dx.doi.org/10.1145/2487276.2487278.

Ron Maharik, Mikhail Bessmeltsev, Alla Sheffer, Ariel Shamir, and Nathan Carr. 2011. Digital micrography. ACM Trans. Graph. 30, 4, Article 100 (Jul. 2011), 12 pages. DOI=http://dx.doi.org/10.1145/2010324.1964995.

T. Hurtut, P.-E. Landes, J. Thollot, Y. Gousseau, R. Drouillhet, and J.-F. Coeurjolly. 2009. Appearance-guided synthesis of element arrangements by example. In Proceedings of the 7th International Symposium on Non-Photorealistic Animation and Rendering (NPAR '09), Stephen N. Spencer (Ed.). ACM, New York, NY, USA, 51-60. DOI=http://dx.doi.org/10.1145/1572614.1572623.

Jonathan Palacios and Eugene Zhang. 2007. Rotational symmetry field design on surfaces. ACM Trans. Graph. 26, 3, Article 55 (Jul. 2007). DOI: https://doi.org/10.1145/1276377.1276446.

Stanley Osher and James A. Sethian. 1988. Fronts propagating with curvature-dependent speed: algorithms based on Hamilton-Jacobi formulations. J. Comput. Phys. 79, 1 (Nov. 1988), 12-49. DOI=10.1016/0021-9991(88)90002-2 http://dx.doi.org/10.1016/0021-9991(88)90002-2.

Ran Gal, Olga Sorkine, Tiberiu Popa, Alla Sheffer, and Daniel Cohen-Or. 2007. 3D collage: expressive non-realistic modeling. In Proceedings of the 5th international symposium on Non-photorealistic animation and rendering (NPAR 07). ACM, New York, NY, USA, 7-14, 145. DOI: https://doi.org/10.1145/1274871.1274873.

Jie Xu and Craig S. Kaplan. 2007. Calligraphic packing. In Proceedings of Graphics Interface 2007 (GI '07). ACM, New York, NY, USA, 43-50. DOI=http://dx.doi.org/10.1145/1268517.1268527.

Ran Gal, Ariel Shamir, and Daniel Cohen-Or. 2007. Pose-Oblivious Shape Signature. IEEE Transactions on Visualization and Computer Graphics 13, 2 (Mar. 2007), 261-271. DOI=http://dx.doi.org/10.1109/TVCG.2007.45.

Ketan Dalal, Allison W. Klein, Yunjun Liu, and Kaleigh Smith. 2006. A spectral approach to NPR packing. In Proceedings of the 4th international symposium on Non-photorealistic animation and rendering (NPAR '06). ACM, New York, NY, USA, 71-78. DOI: https://doi.org/10.1145/1124728.1124741.

Junhwan Kim and Fabio Pellacini. 2002. Jigsaw image mosaics. In Proceedings of the 29th annual conference on Computer graphics and interactive techniques</em> (SIGGRAPH '02). ACM, New York, NY, USA, 657-664. DOI=http://dx.doi.org/10.1145/566570.566633.

Alejo Hausner. 2001. Simulating decorative mosaics. In Proceedings of the 28th annual conference on Computer graphics and interactive techniques (SIGGRAPH '01). ACM, New York, NY, USA, 573-580. DOI=http://dx.doi.org/10.1145/383259.383327.

Craig S. Kaplan and David H. Salesin. 2000. Escherization. In Proceedings of the 27th annual conference on Computer graphics and interactive techniques (SIGGRAPH '00). ACM Press/Addison-Wesley Publishing Co., New York, NY, USA, 499-510. DOI=http://dx.doi.org/10.1145/344779.345022.

Michael T. Wong, Douglas E. Zongker, and David H. Salesin. 1998. Computer-generated floral ornament. In Proceedings of the 25th annual conference on Computer graphics and interactive techniques (SIGGRAPH '98). ACM, New York, NY, USA, 423-434. DOI: http://dx.doi.org/10.1145/280814.280948.

S. C. Hsu, I. H. H. Lee, and N. E. Wiseman. 1993. Skeletal strokes. In Proceedings of the 6th annual ACM symposium on User interface software and technology (UIST '93). ACM, New York, NY, USA, 197-206. DOI: https://doi.org/10.1145/168642.168662.

B. Jobard and W. Lefer. Creating evenly-spaced streamlines of arbitrary density. , Visualization in Scientific Computing '97: Proceedings of the Eurographics Workshop in Boulogne-sur-Mer France, Apr. 28-30, 1997, pp. 43-55. Springer Vienna, Vienna, 1997. doi: 10.1007/978-3-7091-6876-9_5.

F. Hutcheson. An Inquiry Into the Original of Our Ideas of Beauty and Virtue. 2008.

T. Ijiri, R. Mech, T. Igarashi, and G. S. P. Miller. An example-based procedural system for element arrangement. Comput. Graph. Forum, 27:429-436, 2008.

A. Johnson. Clipper—an open source freeware library for clipping and offsetting lines and polygons. http://www.angusj.com/delphi/clipper.php, 2014.

P. J. Schneider. An algorithm for automatically fitting digitized curves. In A. S. Glassner, ed., Graphics Gems, pp. 1-11, 612-626. Academic Press Professional, Inc., San Diego, CA, USA, 1990.

Search and Examination Report from related GB Application GB1803574.1 dated Aug. 30, 2018, 7 pages.

* cited by examiner

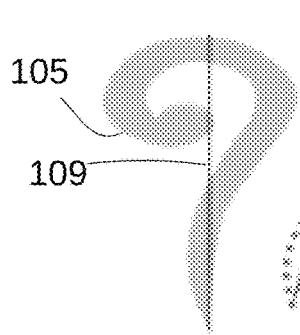 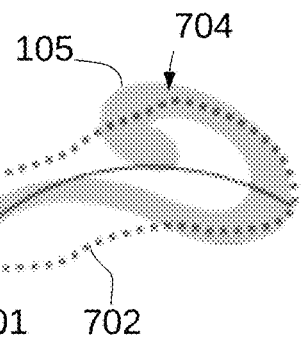 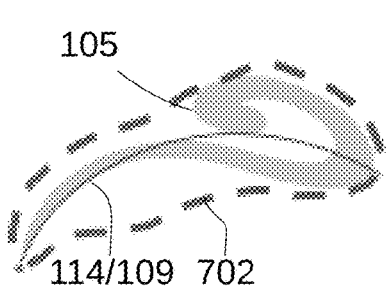
FIG. 7A  FIG. 7B  FIG. 7C
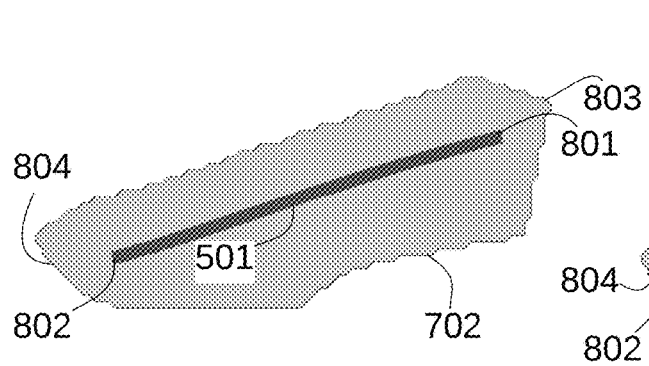 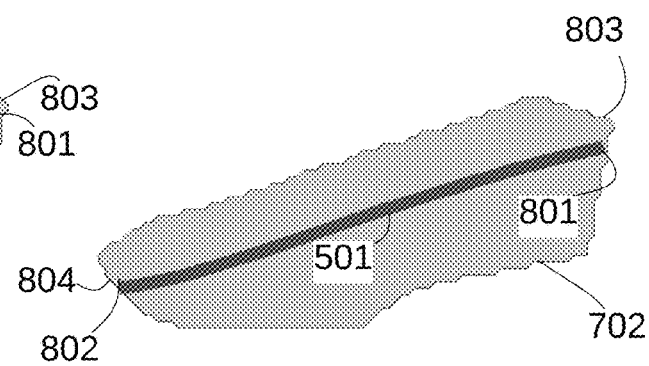
FIG. 8A  FIG. 8B
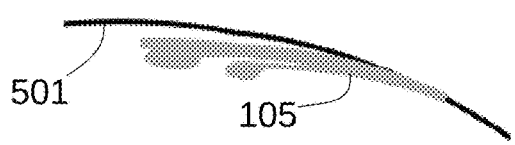 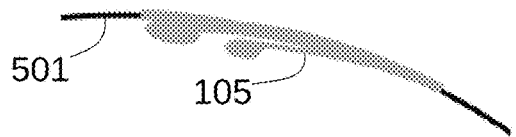
FIG. 9A  FIG. 9B

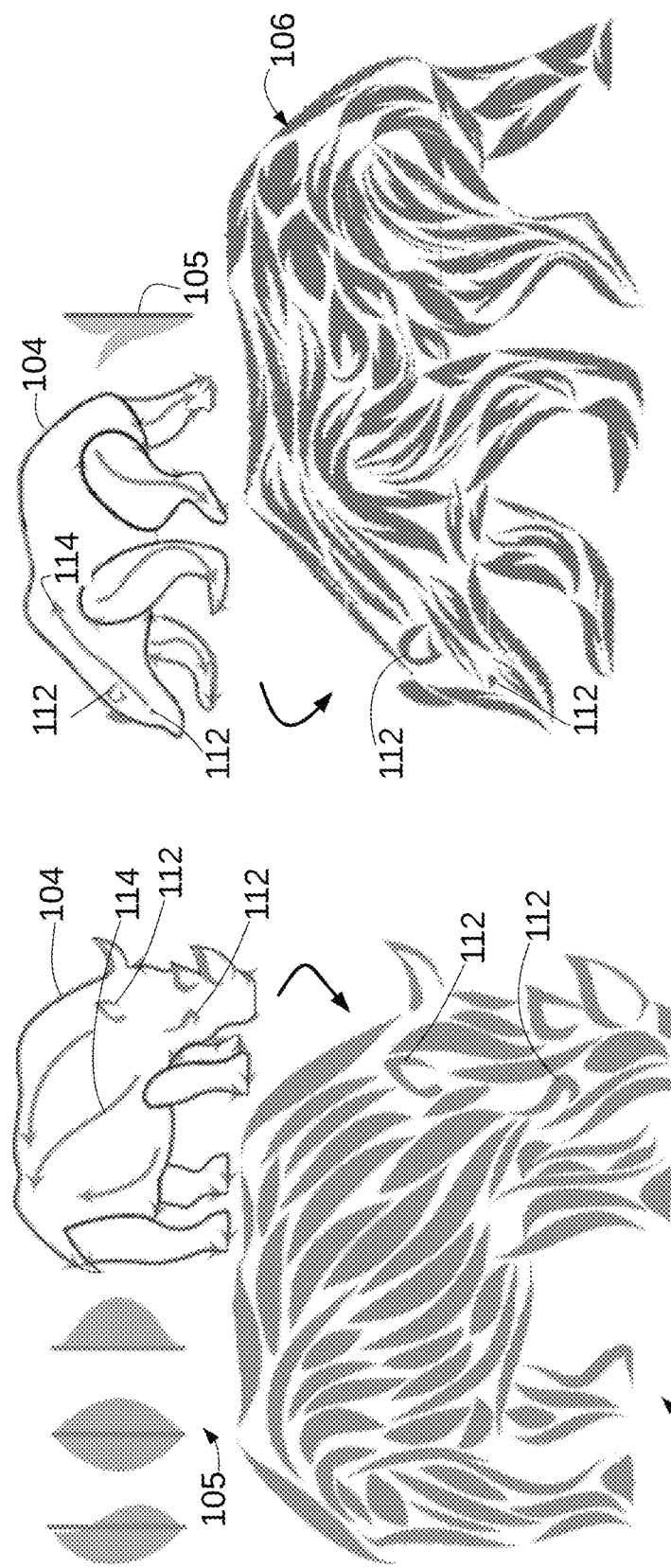
FIG. 10
FIG. 11
FIG. 12

COMPUTERIZED GENERATION OF ORNAMENTAL DESIGNS BY PLACING INSTANCES OF SIMPLE SHAPES IN ACCORDANCE WITH A DIRECTION GUIDE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

This disclosure relates generally to the field of data processing and more particularly to computerized generation of ornamental designs.

BACKGROUND

A popular style of ornamental design involves filling a container region with a number of small decorative elements. The decorative elements are simple geometric forms, often stylized flora, spirals, or other abstract shapes. The elements are large enough that they can be appreciated individually, but they work together to communicate the overall container shape. Typically, they also form a cohesive stylistic family.

There has been a moderate amount of past research in computer graphics, particularly in the field of non-photorealistic rendering, on the generation of packings or mosaics. Most techniques pack elements via rigid motions, leading to high uniformity but insufficient variety. Other work involves distributing small geometric elements to create textures or mosaics. A. Hausner describes in *Simulating decorative mosaics*, Proceedings of the 28$^{th}$ Annual Conference on Computer Graphics and Interactive Techniques, SIGGRAPH '01, pp. 573-580. ACM, New York, N.Y., USA, 2001. doi: 10.1145/383259.383327 for example, a variant of Lloyd's method to distribute square tiles, oriented relative to a vector field, in a simulation of traditional mosaics. Subsequent work has generalized the approach to families of distinct element shapes and incorporated an FFT-based image correlation step to produce more uniform negative space. See, e.g., S. Hiller, H. Hellwig, and O. Deussen, *Beyond Stippling—Methods for Distributing Objects on the Plane*, Computer Graphics Forum, 2003. doi: 10.1111/1467-8659.00699; and, K. Dalal, A. W. Klein, Y. Liu, and K. Smith, *A spectral approach to NPR packing*, Proceedings of the 4th International Symposium on Non-photorealistic Animation and Rendering, NPAR '06, pp. 71-78. ACM, New York, N.Y., USA, 2006. doi: 10.1145/1124728.1124741.

A separate thread of research treats the placement of elements as a form of example-based texture synthesis; see, e.g., T. Hurtut, P.-E. Landes, J. Thollot, Y. Gousseau, R. Drouillhet, and J.-F. Coeurjolly, *Appearance-guided synthesis of element arrangements by example*, Proceedings of the 7th International Symposium on Non-Photorealistic Animation and Rendering, NPAR '09, pp. 51-60. ACM, New York, N.Y., USA, 2009, doi: 10.1145/1572614.1572623; and Z. AlMeraj, C. S. Kaplan, and P. Asente, *Patch-based geometric texture synthesis*, Proceedings of the Symposium on Computational Aesthetics, CAE '13, pp. 15-19. ACM, New York, N.Y., USA, 2013. doi: 10.1145/2487276.2487278. In these techniques, the goal is to reproduce the statistical properties of an input texture, including the irregular spacing between elements. T. Ijiri, R. Měch, T. Igarashi, and G. S. P. Miller, in *An example-based procedural system for element arrangement*, Comput. Graph. Forum, 27:429-436, 2008, propose a growth model in which elements can be oriented relative to a vector field and constrained by boundary curves. In these cases, as with the techniques based on Lloyd's method, elements are placed via translation and rotation, with no provision for deformation.

Other work includes Jigsaw Image Mosaics (JIMs) which pack elements into a container region tightly, leaving no negative space at all. See, e.g., J. Kim, F. Pellacini, *Jigsaw image mosaics*, Proceedings of the 29th Annual Conference on Computer Graphics and Interactive Techniques, SIGGRAPH '02, pp. 657-664. ACM, New York, N.Y., USA, 2002. doi: 10.1145/566570.566633. The JIMs are constructed via an optimization that permits limited degrees of overlap and deformation. Computation of tilings of the plane based on user-supplied shapes is described in: C. S. Kaplan and D. H. Salesin, *Escherization*, Proceedings of the 27th Annual Conference on Computer Graphics and Interactive Techniques, SIGGRAPH '00, pp. 499-510. ACM Press/Addison-Wesley Publishing Co., New York, N.Y., USA, 2000. doi: 10.1145/344779.345022. These techniques do not consider the design opportunities offered by flow or control of negative space.

A distinct category of past research seeks to develop explicit procedural models for authoring decorative patterns. A set of design principles for decorative art that includes: repetition, balance, and conformation to geometric constraints, is articulated along a grammar-like system for laying out floral ornaments by M. T. Wong, D. E. Zongker, and D. H. Salesin, in *Computer-generated floral ornament*, Proceedings of the 25th Annual Conference on Computer Graphics and Interactive Techniques, SIGGRAPH '98, pp. 423-434. ACM, New York, N.Y., USA, 1998. doi: 10.1145/280814.280948. Another example is DecoBrush, in which ornamental elements are deformed along line art as described by J. Lu, C. Barnes, C. Wan, P. Asente, R. Mech, and A. Finkelstein in DecoBrush: Drawing structured decorative patterns by example, ACM Trans. Graph., 33(4):90: 1-90:9, July 2014. doi: 10.1145/2601097.2601190. The PATEX system as described by P. Guerrero, G. Bernstein, W. Li, and N. J. Mitra in *PATEX: Exploring pattern variations*, ACM Trans. Graph., 35(4):48:1-48:13, July 2016. doi: 10.1145/2897824.2925950 preserves high-level geometric relationships like symmetry and repetition while ornamental designs are edited.

Other related research includes that pertaining to packing individual letter-forms or blocks of text into container regions, such as, for example, constructing calligrams by filling a container with a small number of letters, making up one or two words. See, e.g., J. Xu and C. S. Kaplan, *Calligraphic packing*, Proceedings of Graphics Interface 2007, GI '07, pp. 43-50. ACM, New York, N.Y., USA, 2007. doi: 10.1145/1268517.1268527; and C. Zou, J. Cao, W. Ranaweera, I. Alhashim, P. Tan, A. Sheffer, and H. Zhang, Legible compact calligrams, ACM Trans. Graph., 35(4):122: 1-122:12, July 2016. doi: 10.1145/2897824.2925887. The goal is to balance between consuming the container space and preserving legibility. Another example is deformation of lines of text to fit along streamlines in a container such as described by R. Maharik, M. Bessmeltsev, A. Sheffer, A. Shamir, and N. Carr, Digital micrography, ACM SIG- GRAPH 2011 Papers, SIGGRAPH '11, pp. 100:1-100:12. ACM, New York, N.Y., USA, 2011. doi: 10.1145/1964921.1964995.

Finally, some recent work has explored the elaboration of ornamental patterns on surfaces, under constraints imposed by fabrication. For example, W. Chen, X. Zhang, S. Xin, Y. Xia, S. Lefebvre, and W. Wang, Synthesis of filigrees for digital fabrication, ACM Trans. Graph., 35(4):98:1-98:13, July 2016, doi: 10.1145/2897824.2925911 described a method to synthesize filigree patterns. J. Zehnder, S. Coros, and B. Thomaszewski, Designing structurally sound ornamental curve networks, ACM Trans. Graph., 35(4):99:1-99:10, July 2016, doi: 10.1145/2897824.2925888 proposed semi-automated tools for deforming ornamental curves to cover a surface. In both cases, the layout of elements must be computed to satisfy both aesthetic and structural goals-most obviously, elements must overlap to produce a connected result that will hold together when 3D printed.

While the above-described work provides a variety of techniques for generating artistic works there remains a need for computerized methods and systems that can generate ornamental designs employing a container filled with irregularly shaped elements that are visually pleasing and that permit the elements to be appreciated individually while communicating the overall shape of the container.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically:

FIGS. 7A, 7B and 7C illustrate deformation of an element.

FIGS. 8A and 8B illustrate aspects of streamline stretching.

FIGS. 9A and 9B illustrate streamline snapping.

FIGS. 10, 11 and 12 provide further examples of ornamental packings.

DETAILED DESCRIPTION

Figure 1:
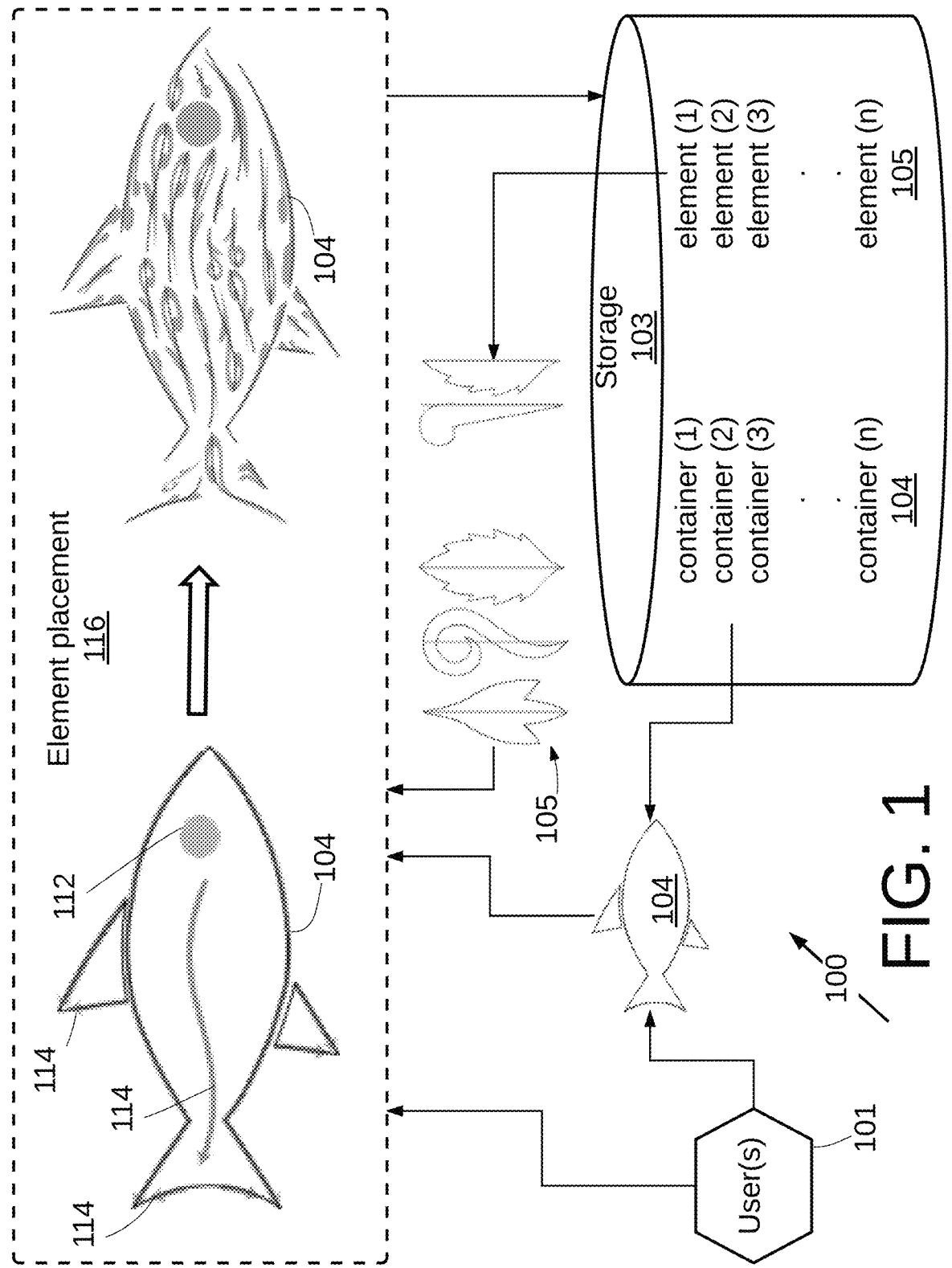
FIG. 1 is a high-level diagram illustrating an embodiment of an ornamental element packing system.

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

The systems and methods disclosed herein permit computerized drawing of ornamental designs consisting of placed instances of simple shapes. These shapes, called elements, may be selected from a small library of templates. The elements are deformed to flow along a direction field interpolated from user-supplied strokes, giving a sense of visual flow to the final composition, and constrained to lie within a container region. In an implementation, a vector field is computed based on the user-supplied strokes. Streamlines that conform to the vector field are constructed, and an element is placed over each streamline.

An ornamental element packing system 100 that operates as described above is shown in FIG. 1. One or more user(s) 101 interact with the system 100 to generate ornamental designs such as seen at 106. The system 100 includes storage 103 that may be used to store a plurality of pre-generated containers 104 and a plurality of pre-generated elements 105. The containers 104 take the form of visual images which take the form of a simple closed curve, in other words, a curve with no endpoints and which completely encloses an area and in which the curve does not cross itself. The simple closed curve is not limited to any particular shape, such as known geometric shapes, but instead may be asymmetrical and may be irregularly shaped, such as for example the various images shown in the figures. While the images shown in the figures are of animals or an animal head or human skull, the containers 104 are not limited to images of animals or humans. While the container 104 is shown as a visually closed container with a contiguous perimeter, the completed ornamental design 106 need not have a visible perimeter that is contiguous or uninterrupted. For example, the ornamental design 106 in FIG. 1 has multiple discontinuities in its perimeter, as do the ornamental designs in the other figures. As explained further, in connection with FIG. 4B, the elements 105 take the form of visual shapes that take the form of a simple closed curve, which need not be symmetrical and which may also be irregularly shaped. An element 105 may also be a set of simple closed curves, such as seen for example at 105.1 in FIG. 4B which has two curves.

The user 101 may cause the system 100 to generate an ornamental design 106 by selecting a container 104. The container 104 selected by the user 101 in FIG. 1 is a set of three containers: the fish body, and two fins. The user 101 may also select one or more elements 105 for placement within container 104. The selected element(s) 105 are placed by system 100 via a series of operations shown generally at 116 and described further in connection with the remaining figures and accompanying description. Briefly, for element placement 116, the user 101 will provide one or more, typically multiple, user-specified directional flows, or direction guides, for the selected container 104. One flow can be seen in FIG. 1 at 114 within the body of the fish. Other flows may be placed at other positions within the container 104, and also, as seen, along the perimeter of the container 104. The user 101 may also place one or more fixed elements into container 110 such as the eye 112. The fixed elements 112 may be selected from a set of fixed elements stored in storage 103 or may be manually generated by the user 101. Selected elements 105 are placed in the selected container 104 by orienting them in the local direction of flow as indicated by directional flow 114. The selected elements 105 may also be deformed to capture changes in flow direction. Certain elements 105 are also deformed to balance the usage of negative space with adjacent elements. The size of certain elements 105 may also be changed. In certain embodiments, the element placement 116 operations place the selected elements 105 to achieve one or more of the following (i) follow the flow defined by the direction guide 114, (ii) have as little empty space as possible between the placed elements, (iii) make the spacing between elements be as even as possible, (iv) conform the elements to the container boundaries, (v) vary element width and length to avoid an excessively uniform arrangement.

The resulting ornamental design 106 for container 104 may be stored in storage 103 and/or made available to the user 101 for other uses such as transmission to others, further editing, printing, etc. Digital storage 103 is shown generally but can take a variety of forms of storage for digital content including storage that is spread physically across numerous storage devices and also that is partially or wholly distant physically from other portions of system 100.

Figure 2:
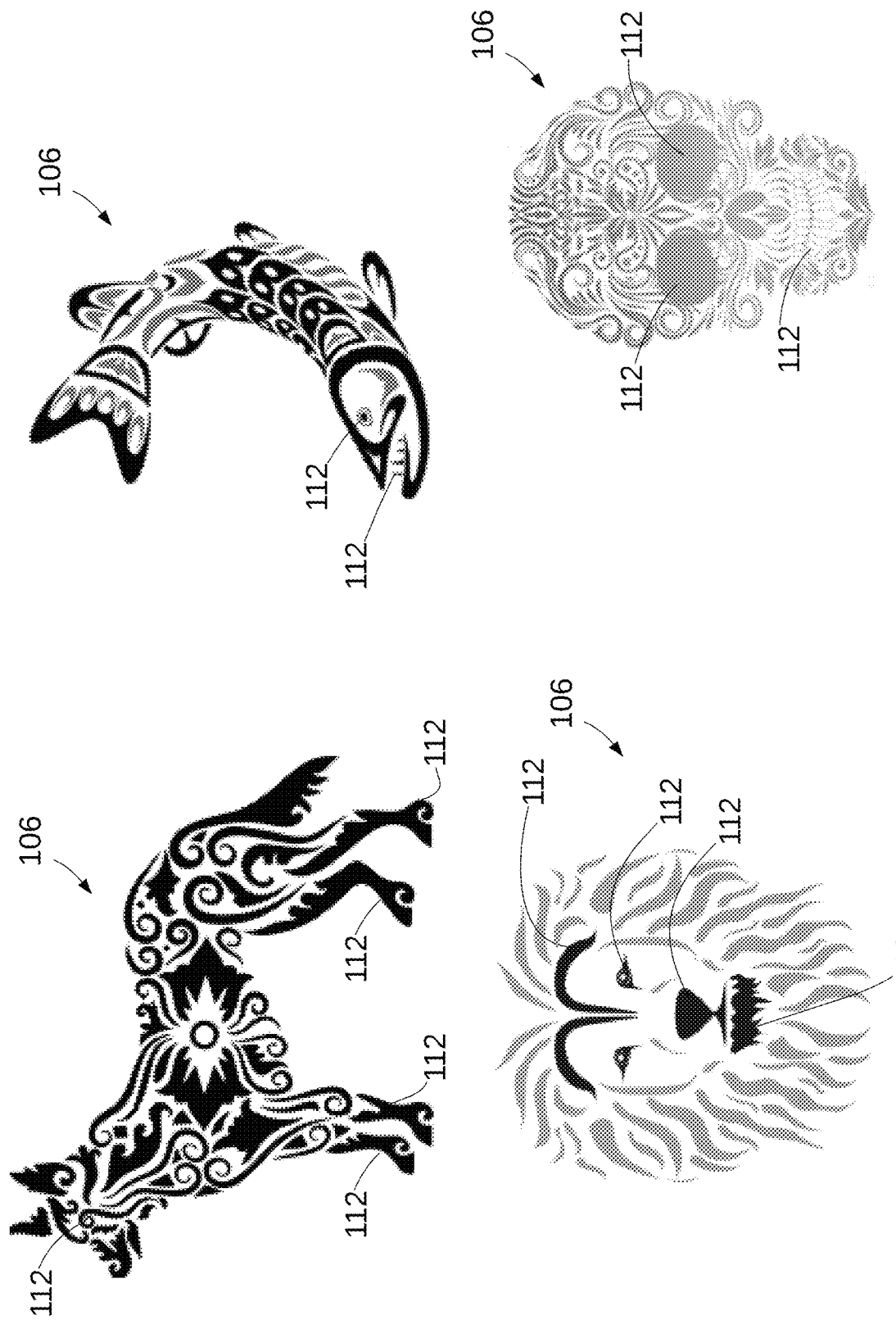
FIG. 2 illustrates four additional examples of ornamental packings.
Figure 4B:
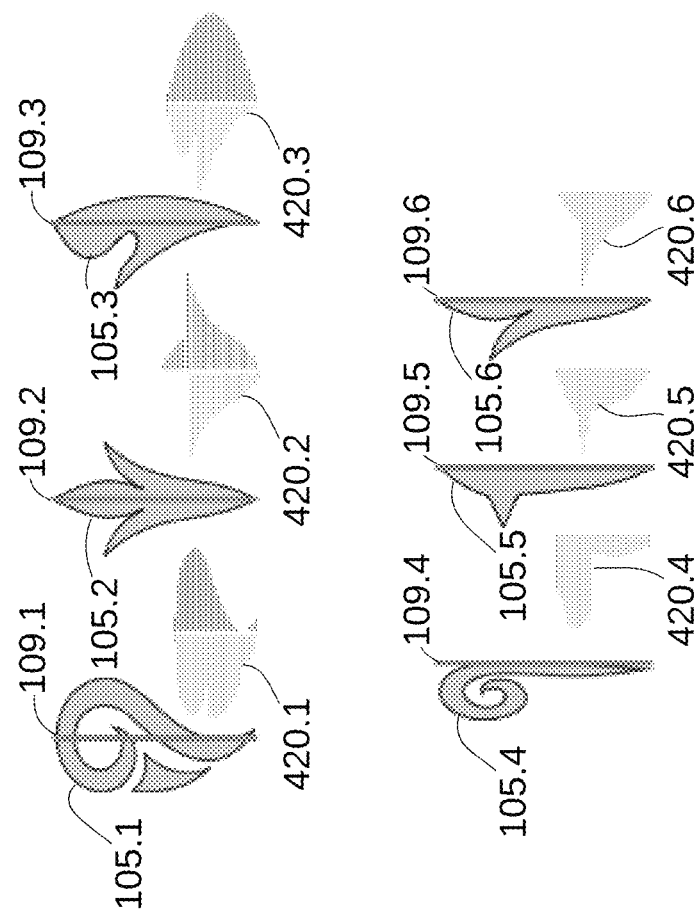
FIG. 4B is an illustration of the operations shown in FIG. 4A.

FIG. 2 illustrates four additional examples of ornamental designs 106, such as a dog, fish, lion head, and skull, that may be generated by system 100. Examples of elements 105 are shown in FIG. 4B (described in further detail below) where each element 105 has associated therewith a spine 109 that controls deformation of the associated element 105. Embodiments of system 100 operate to generate the ornamental designs 106 seen in FIGS. 1 and 2 (and also as later described, in FIGS. 9-11) in accordance with one or more high-level principles that are important to their construction. (1) Balance—composition does not exhibit too much variation in local amounts of positive and negative space. Typically, this goal is accomplished by limiting variation in the diameters of elements (controlling the variation in positive space), and in ensuring that elements are spaced evenly (controlling negative space). (2) Flow—in local parts of a composition, the elements are oriented to communicate a sense of directionality or flow. The examples shown exhibit some amount of flow. In the dog, many elements appear to flow outward from the flower in the center of the torso, and then up the neck and down into the legs. The scales and other elements on the fish flow along the length of its body. In the lion and skull, elements flow horizontally outward from a central axis of symmetry, suggesting fur or whiskers in the case of the lion. Flow adds visual interest to a composition, engaging the viewer by providing a sense of progression and movement through elements. (3) Uniformity amidst variety—repeated elements must balance between two opposing forces. Uniformity aims for an overall unity of design; variety seeks to break up the monotony of pure repetition. Elements should be permitted to vary in shape, but in a controlled way. This principle is referred to as uniformity amidst variety, a term borrowed from philosopher Francis Hutcheson. See, F. Hutcheson, *An Inquiry Into the Original of Our Ideas of Beauty and Virtue*, J. and J. Knapton and others, 1729. See also on the role of variation in design, E. H. Gombrich, *The Sense of Order: A Study in the Psychology of Decorative Art*, Phaidon Press Limited, 1984. In the examples herein, the dog's spirals and the fish's scales both obey this principle. The lion and skull do as well, except that half of the elements are reflected copies of the other half, across a vertical line through the center of the composition. This repetition emphasizes the bilateral symmetry in the design. (4) Fixed elements—compositions use a small number of fixed elements to solve specific design problems or provide focal points. In any figurative drawing, eyes serve as a powerful focal point; every example in FIG. 2 has eyes drawn in as unique fixed elements 112 (the dog's eye is expressed via a carefully placed spiral). Other situations that call for specialized shapes include the dog's paws. the fish's teeth and fins, the lion's beard, and the skull's teeth. Sharp variation in the balance of positive and negative space can also be used to emphasize a focal point, as in the empty region around the fish's eye. (5) Boundaries—in many ornamental packings, elements are carefully arranged to conform to and emphasize container boundaries. The fish demonstrates this principle most clearly: we can easily fill in the gaps between elements to form a mental image of a continuous outline. The dog's elements are also well aligned to indicate the container shape. However, this rule is not universal. The lion artfully subverts it with elements that flow outward to an indistinct boundary, helping to convey the appearance of fur.

The results of the system 100 also avoid packing elements via rigid motions that lead to high uniformity but insufficient variety. The system 100 provides systematic modes of geometric deformation that can generate plausible families of related decorative elements from a single input shape. The system 100 focuses on packing large numbers of small elements to generate compositions of large, visually distinct elements. The packing is not too dense so that every single shape is recognizable.

Figure 3A:
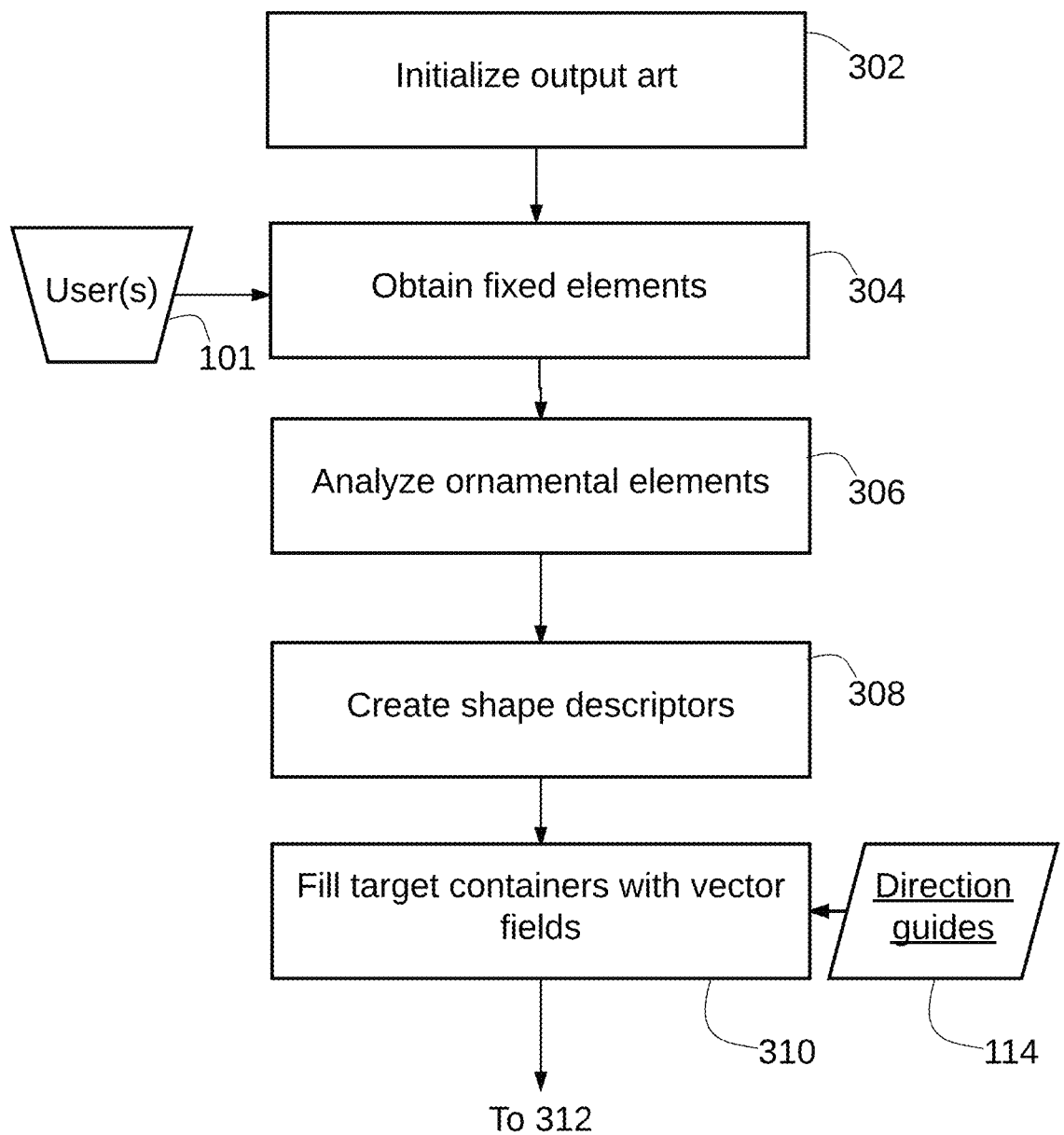
FIGS. 3A and 3B are flowcharts illustrating details of operation of element placement 116 operations of FIG. 1.
Figure 3B:
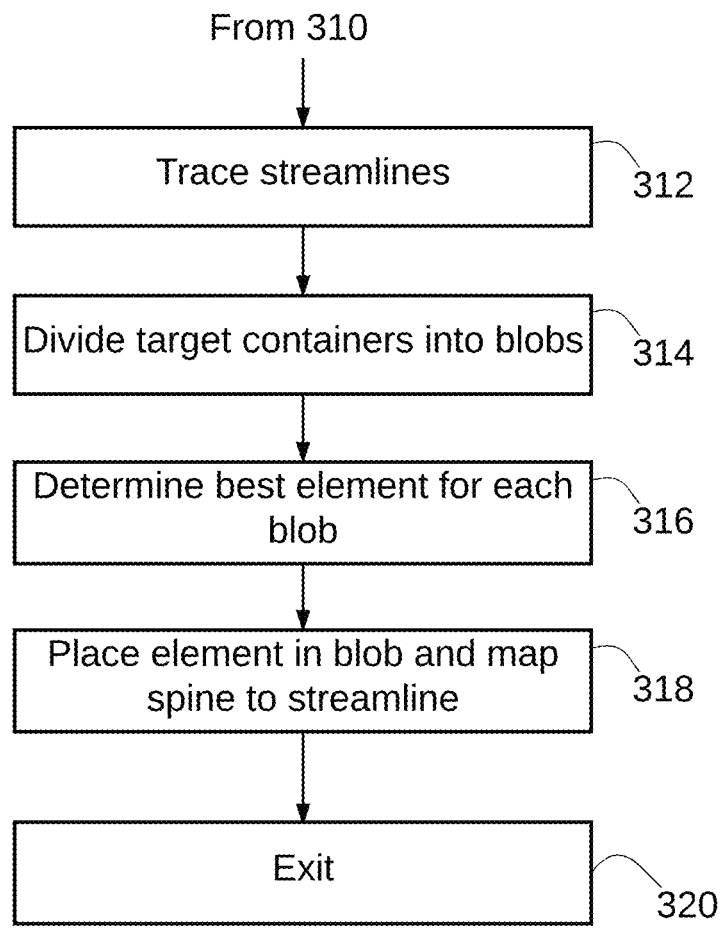
Figure 3C:
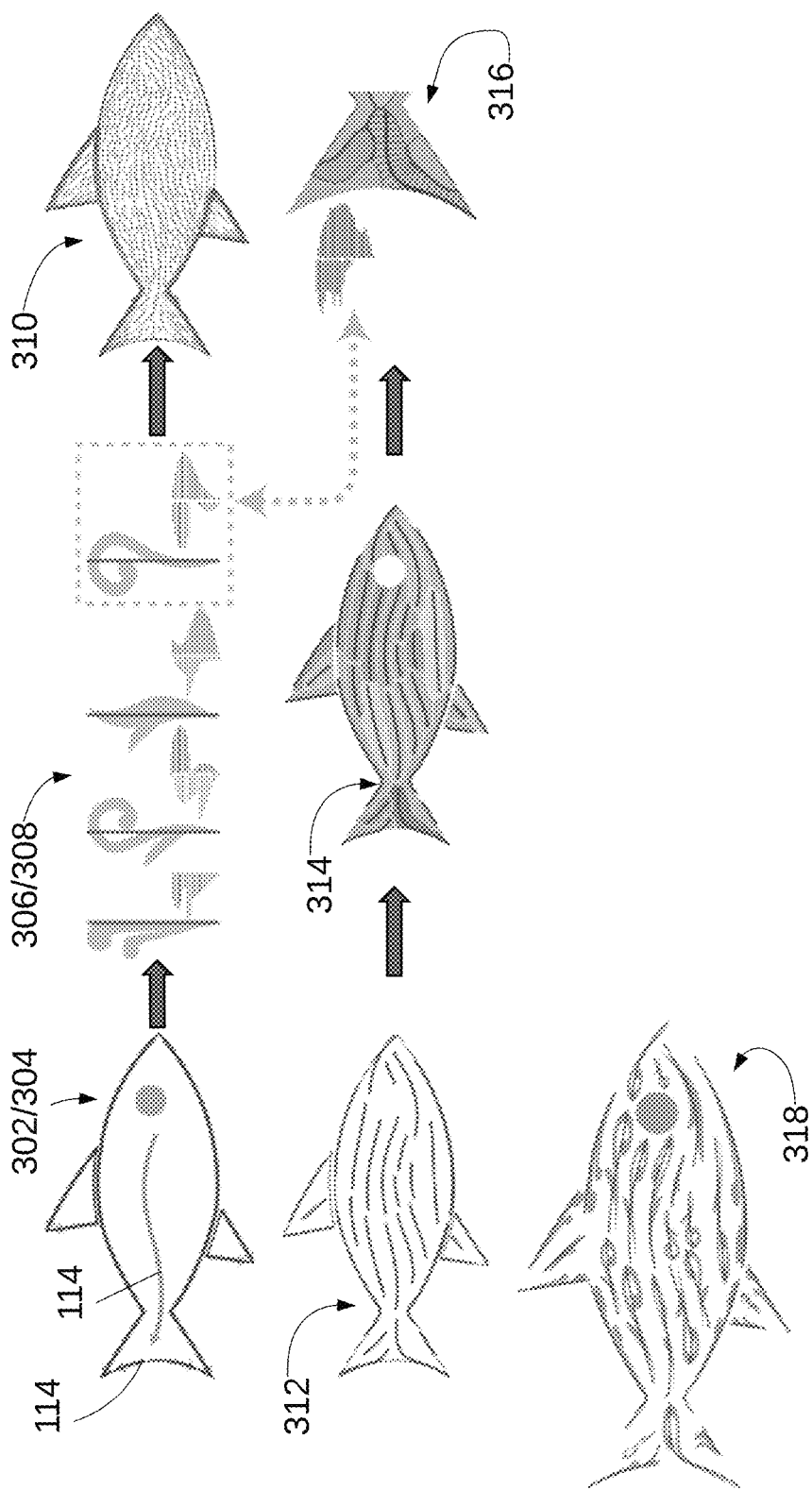
FIG. 3C is an illustration of the steps shown in FIGS. 3A and 3B.

FIGS. 3A and 3B are flowcharts illustrating details of operation of element placement 116 operations of FIG. 1. FIG. 3C illustrates the results visually of the steps performed in FIGS. 3A and 3B. The operations shown in FIGS. 3A, 3B and 3C are summarized here with details provided in connection with the remaining figures. Output data structures are initialized at 302 and any fixed elements such as 112 are obtained at 304 via user inputs 306. The selected ornamental elements 105 are analyzed at 308 and a shape descriptor is created at 310 for each selected ornamental element 105. Direction guide 114 is used at 310 to fill each target container 106 with a vector field. FIG. 1 shows a single direction guide 114 but there may be more than one direction guide. Streamlines are traced at 312 in the vector fields. The target containers are divided into blobs around the streamlines at 314. At 316, the element shape descriptors are used to determine the best element for each blob. At 318, the element is placed in a corresponding blob, treating it as a skeletal stroke and mapping its spine to the streamline.

In instances where there are multiple containers to be filled, the operations described herein are performed for each container. A variable, input_size is defined to be the maximum of the combined width or height of all the target containers and fixed elements as laid out by the user 101. This will be used to set various parameters in the synthesis process.

Ornamental elements 105 take the form of one or more closed curves that may be irregularly shaped. Placement of the elements 105 requires deformation of many if not most placed elements employing a simple skeletal stroke algorithm such as described by S. C. Hsu, I. H. H. Lee, and N. E. Wiseman in Skeletal strokes, in Proceedings of the 6th Annual ACM Symposium on User Interface Software and Technology, UIST '93, pp. 197-206. ACM, New York, N.Y., USA, 1993. doi: 10.1145/168642.168662. Such a technique employs a straight spine, such as spine 109 to guide the deformation. The spine 109 does not need to go through the center of the element 105; it can be anywhere. Examples of spines 109 (specifically, 109.1-109.6) corresponding to elements 105 can be seen in FIG. 4B which shows two classes of elements: full elements, such as 105.1-105.3, that extend on both sides of their spine, and half elements, such as 105.4-105.6, that are entirely on one side of their spine. If the input 101 includes direction guides 114 that coincide with target container boundaries, the half elements will be placed to align along these boundaries. Half elements that have edges that closely follow their spines, operate to visually reinforce container boundaries.

Figure 4A:
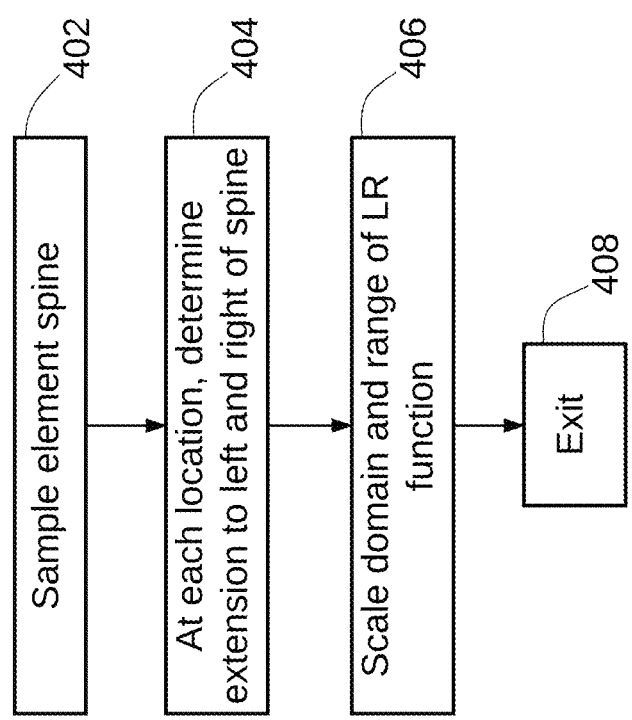
FIG. 4A is a flowchart illustrating further details of generation of an LR function for element placement.

For each element, a simple shape descriptor called an LR function is created. This will later be used to choose which element to place. FIG. 4A shows the construction of the shape descriptor. In 402, the element 105's spine 109 is sampled at n locations. A value of n=100 generally provides sufficient granularity. At 404, at each sampled location a determination is made as to how far the ornament extends to the left and right of the spine. The LR function is the set {L, R} where L={L1, . . . , Ln} is the left function and R={r1, . . . , rn} is the right function. Further details of such a technique are described by R. Gal, A. Shamir, and D. Cohen-Or in Pose-oblivious shape signature, IEEE Transactions on Visualization and Computer Graphics, 13(2):261-271, March 2007. doi: 10.1109/TVCG.2007.45.

Intuitively, LR functions take up an approximate area of an ornamental element. FIG. 4B shows six elements (full elements 105.1-105.3, and half elements 105.4-105.6). The left and right values associated with each element 105 are shown graphically together with the element associated element at 420.1-420.6. Full elements 105.1-105.3 have non-empty left and right sides, while half elements 105.4-105.6 have only one side. The LR functions are normalized to a unit square at 406 by scaling their domain and range to the interval [0,1].

To place the elements 105 in accordance with the user-defined flows, as defined by direction guides 114, each target container 104 is filled with a vector field, constrained by the direction guides 114 in that container. The directional guides 114, D={d1, d2, . . . , dn} are each sampled and the tangent at every sampled point is used as a directional constraint. A vector field, shown generally at 310 in FIG. 3C, is then constructed using the N-RoSy (N-way Rotational Symmetry) algorithm described by J. Palacios and E. Zhang, Rotational symmetry field design on surfaces, in ACM SIGGRAPH 2007 Papers, SIGGRAPH '07. ACM, New York, N.Y., USA, 2007. doi: 10.1145/1275808.1276446. Fixed elements 112 do not affect the vector field. The user 101 can include directional guides 114 to guide the vector field around fixed elements 112 if so desired.

Figure 5:
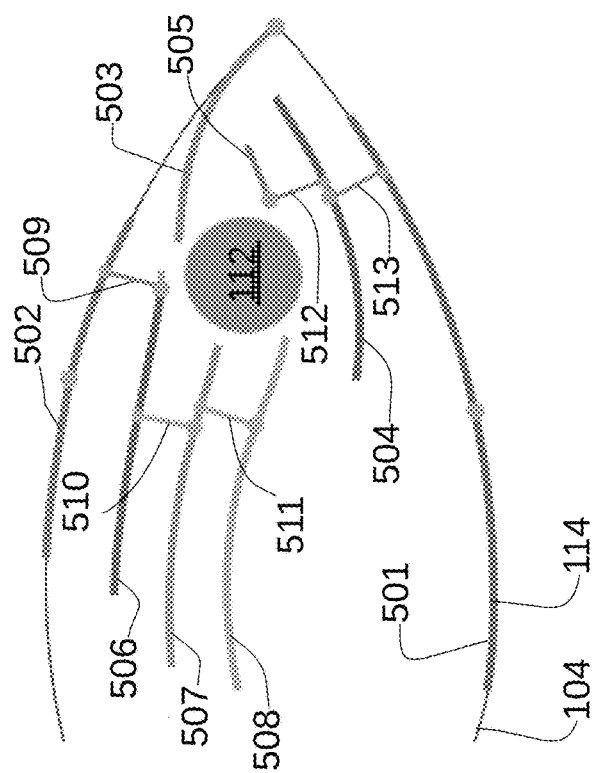
FIG. 5 is an illustration of streamline tracing.

FIG. 5 illustrates further details of step 312 of FIGS. 3B and 3C of tracing of streamlines (such as for example 501-508 in FIG. 5) in the vector field. Streamline tracing is guided by three input parameters: d_gap is the desired space between streamlines, such as seen at 509-513, s_max is the maximum desired streamline length, s_min is the minimum desired streamline length. The first streamline 501 always begins on a directional guide 114. Subsequent streamlines (502-508) begin on the container 104 boundary, a directional guide 114, or at a point that is d_gap away from a previous streamline. In a later step, elements 105 are placed along streamlines without overlap so d_gap determines the approximate width of the placed elements, and s_max the maximum length. A value d_stop is derived and is employed to prevent streamlines from coming too close to each other. In a sample implementation d_stop=0.8_dgap.

In one embodiment, the streamline tracing algorithm described by B. Jobard and W. Lefer, *Creating evenly-spaced streamlines of arbitrary density*, in W. Lefer and M. Grave, eds., Visualization in Scientific Computing '97: Proceedings of the Eurographics Workshop in Boulogne-sur-Mer France, Apr. 28-30, 1997, pp. 43-55. Springer Vienna, Vienna, 1997. doi: 10.1007/978-3-7091-6876-9_5, is adapted and implemented as shown in the pseudocode below. A set of potential seed points P={p1, p2, . . . , pn} is generated by densely resampling the target container 104 boundary T and the directional guides 114 in D. By way of example, a sampling distance of 0.005 input_size may be used. An empty set of streamlines is created and the potential seed points of P are randomly ordered. A new streamline s is generated by randomly removing a seed point from P and following the vector field until one of the following conditions holds:

1. the length of s would exceed s_max.
2. s would come within d_stop of another streamline.
3. s would cross T, leaving the container 104.
4. s would cross the boundary of a fixed element 112.

The length of s is tested and if the length of s is less than s_min, it is discarded. Otherwise s is sampled again using 0.005 input_size, and at each point two more potential seeds are generated that are d_gap away from s on either side. If a seed is inside the container 104, it is added to P. The process is repeated until P is empty. Note that the d_stop distance test combined with the s_min length test implies that many attempts to form streamlines will stop immediately, especially as the container fills with streamlines. P is sorted to order the points in P according to their distance from the boundary T and the directional guides in D, with closer points first and equally distant points ordered randomly. Because the initial points are all on T or on a path in D, their sort value is zero, and they will be processed before any derived points.

The target containers 104 are filled with vector fields (step 310 of FIG. 3A) as follows for the filling of a single container 106. The above described operations may be implemented in software code in a manner shown in the pseudocode below.

---

Tracing streamlines

```
Create a seed list P = {p1, p2,..., pn} by uniformly resampling T
and the guides in D.
Create an empty set S of streamlines.
Randomly order the elements of P.
while P is not empty do
    Generate a new streamline s from p1.
    Remove p1 from P.
    if s is longer than s_min then
        Add s to S.
        Create seed points that are d_gap away from s and add them
        to P.
        SORT(P).
    end if
end while
```
Copyright 2016 Adobe Systems Inc.

---

Figure 6:
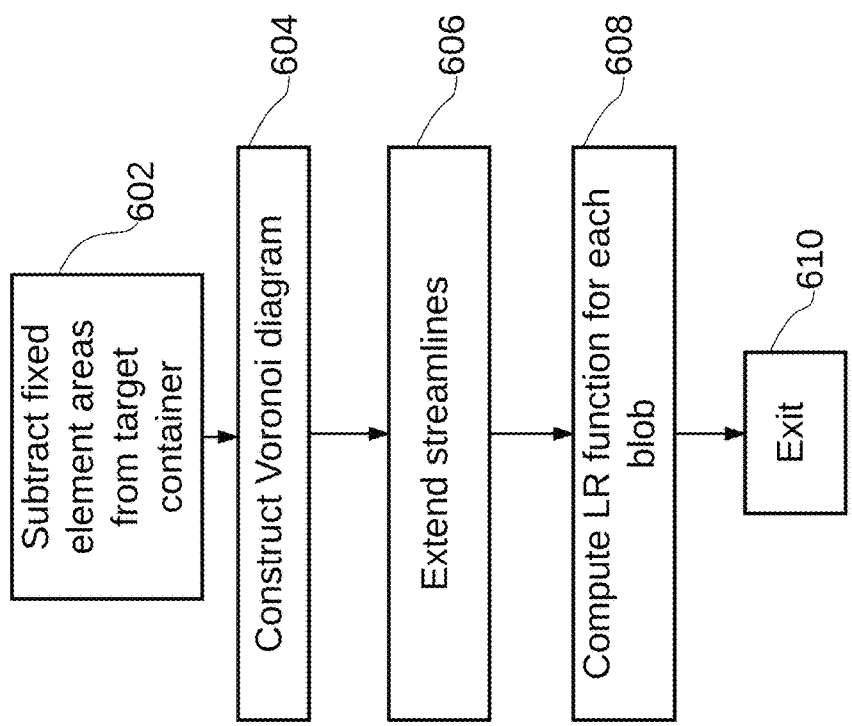
FIG. 6 is a flowchart illustrating further details of element and blob matching.

FIG. 6 illustrates the operations performed to assist in choosing which element 105 to place along each streamline. At 602, the areas of any fixed elements 105 are subtracted from the target container 104. At 604, an approximate generalized Voronoi diagram is constructed of the interior using the method described by S. Osher and J. A. Sethian, in *Fronts propagating with curvature-dependent speed: Algorithms based on hamilton-jacobi formulations*, J. Comput. Phys., 79(1):12-49, November 1988. doi: 10.1016/0021-9991(88)90002-2. As will be appreciated by those skilled in the art, a Voronoi diagram is a partitioning of a plane into regions based on distance to points in a specific subset of the plane. The streamlines are extended at 606 at each end, following the vector field, until they encounter the boundaries of their Voronoi regions. The area around each streamline is referred to as a sub-region blob, such as seen generally at 314 in FIG. 3C and operates as a placement area for an element 105. At 608, an LR function is computed for each blob as described above in connection with FIG. 4A using the streamline as the spine 109. Because the streamline is not usually straight, the left and right distances along the normals to the streamline are computed. The LR function approximates the blob's shape if the streamline were to be straightened.

The next step is to place an ornamental element 105 in each blob, such as shown in FIGS. 7A-7C. The element 105 to place in blob 702 is chosen by finding the element that minimizes a sum of least squares distance between the outer perimeter of the element 105 and the inner perimeter of the blob 702, defined as $$\sum_{i=1}^{N} (\alpha_{li} - \beta_{li})^2 + \sum_{i=1}^{N} (\alpha_{ri} - \beta_{ri})^2$$

where
$\alpha_l$ is the element left function
$\alpha_r$ is the element right function
$\beta_l$ is the blob left function
$\beta_r$ is the blob right function Each element 105 is evaluated for placement in four orientations: as drawn, as reflected across its spine, as reflected along its spine, and as reflected both across and along its spine. To reflect across the spine, the left and right functions are swapped. To reflect along the spine, the left and right functions are reparameterized to go from 1 to 0 instead of 0 to 1. Note that this matching method automatically places half elements along streamlines that follow a container boundary, visually reinforcing the overall shape.

An alternative for shape matching may be employed using an approach discussed by R. Gal, O. Sorkine, T. Popa, A. Sheffer, and D. Cohen-Or in 3D collage: Expressive non-realistic modeling, in Proceedings of the $5^{th}$ International Symposium on Non-photorealistic Animation and Rendering, NPAR '07, pp. 7-14. ACM, New York, N.Y., USA, 2007, doi: 10.1145/1274871.1274873. Such an approach tries to fill a sub-region blob as much as possible, with heavy penalties if a part of an element protrudes outside the boundary of the blob. However, this has been found to make computation more expensive without providing significant advantages over the LR functions disclosed herein.

FIGS. 7A, 7B and 7C illustrate the deformation process as it bends the element 105 along the streamline and scales it to fit inside a blob 702. Once an element 105 is chosen, it is placed as seen in FIGS. 7A, 7B and 7C along the streamline 114 using a simple skeletal stroke algorithm such as described by S. C. Hsu, I. H. H. Lee, and N. E. Wiseman, in Skeletal strokes, in Proceedings of the 6th Annual ACM Symposium on User Interface Software and Technology, UIST '93, pp. 197-206. ACM, New York, N.Y., USA, 1993. doi: 10.1145/168642.168662. The element 105's width is uniformly scaled to make it as wide as possible while still staying inside the blob 702 such as shown in FIG. 7C. FIG. 7A illustrates the selected element 105 and spine 109. In FIG. 7B the element has been placed in blob 702 and the element has been deformed to cause spine 109 to follow a streamline, such as for example, streamline 501. As seen in FIG. 7B the element 105 fits largely in blob 702 but a portion such as seen at 704 extends beyond the perimeter of the blob 702. In FIG. 7C the element 105 has been scaled to cause the portion 704 that extended beyond the blob 702 perimeter to fit within the blob 702 perimeter.

FIGS. 8A and 8B illustrate aspects of streamline stretching as described above in connection with step 606. As seen in FIGS. 8A and 8B, the streamline 501 is stretched until ends 801 and 802 approach and touch the boundaries 803 and 804 of the blob 702. This permits an element 105 placed within the blob 702 to be longer because the associated streamline 501 is longer.

FIGS. 9A and 9B illustrate another aspect referred to as streamline snapping. If almost the entire part of a streamline 501 is close to a boundary of element 105, the entire streamline is adjusted (snapped) to be exactly on the boundary. This permits better conformity between the streamline 501 and the boundary of the element 105.

The containers and decorative elements may be designed in a vector graphics editor such as Adobe Illustrator, available from Adobe Systems Incorporated, and then used as inputs to a C++ program that outputs final placed elements in an SVG file. The Clipper library as described by A. Johnson, Clipper—an open source freeware library for clipping and offsetting lines and polygons, http://www.angusj.com/delphi/clipper.php, 2014, may be used for calculation of LR functions and for testing polygon intersections during deformation and growth. As a post-process, optionally outlines may be smoothed and polygonal paths may be replaced with Bézier curves. Finally, colors and other treatments may be applied in an editor.

The techniques disclosed herein may be used with a variety of container shapes, and many different ornamental elements with varying amounts of geometric complexity. FIG. 10 shows a packing of a rhinoceros 106 with simple teardrop elements 105 that demonstrates the variety achievable in shape and curvature. More complex leaf elements 105 are used on the bear 106 in FIG. 11. The tracing parameters are adjusted to obtain shorter placed elements. The placed elements may also be further processed to create a distressed look.

In certain embodiments, extensions may be added to the pipeline to enhance aesthetic value and flexibility. For example, as shown in FIG. 12, explicit new shapes are constructed to fill the negative space between placed elements, by computing offset polygons from the negative space between elements. The result is a distinct and appealing style.

The embodiments disclosed herein create ornamental packings, in which vector fields are used to provide a sense of visual flow. A degree of uniformity is achieved by using repeated copies of a small set of initial decorative elements, but that uniformity is balanced with variety by deforming those elements. In other embodiments, multiple shorter elements may be threaded along streamlines instead of requiring elements to completely fill streamlines.

Figure 13:
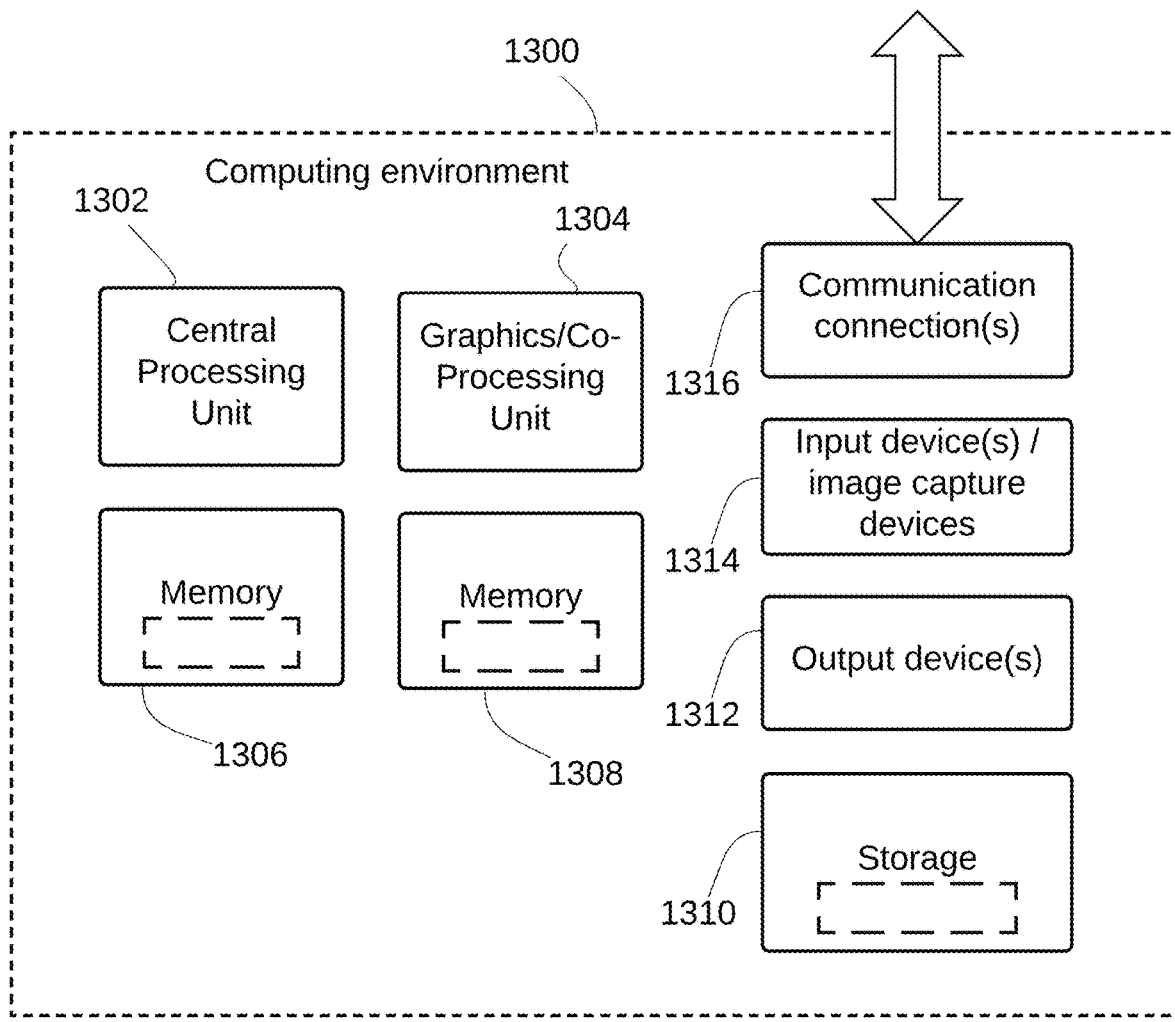
FIG. 13 illustrates a block diagram of hardware that may be employed in various embodiments.

FIG. 13 depicts a generalized example of a suitable general purpose computing system 1300 in which the described innovations may be implemented in order to improve the processing speed and efficiency with which the computing system 1300 generates ornamental designs 106. With reference to, FIG. 13, the computing system 1300 includes one or more processing units 1302, 1304 and memory 1306, 1308. The processing units 1302, 1306 execute computer-executable instructions. A processing unit can be a general-purpose central processing unit (CPU), processor in an application-specific integrated circuit (ASIC) or any other type of processor. The tangible memory 1306, 1308 may be volatile memory (e.g., registers, cache, RAM), non-volatile memory (e.g., ROM, EEPROM, flash memory, etc.), or some combination of the two, accessible by the processing unit(s). The hardware components in FIG. 13 may be standard hardware components, or alternatively, some embodiments may employ specialized hardware components to further increase the operating efficiency and speed with which the system 100 operates.

Computing system 1300 may have additional features such as for example, storage 1310, one or more input devices 1314, one or more output devices 1312, and one or more communication connections 1316. An interconnection mechanism (not shown) such as a bus, controller, or network interconnects the components of the computing system 1300. Typically, operating system software (not shown) provides an operating system for other software executing in the computing system 1300, and coordinates activities of the components of the computing system 1300.

The tangible storage 1310 may be removable or non-removable, and includes magnetic disks, magnetic tapes or cassettes, CD-ROMs, DVDs, or any other medium which can be used to store information in a non-transitory way and which can be accessed within the computing system 1300. The storage 1310 stores instructions for the software implementing one or more innovations described herein.

The input device(s) 1314 may be a touch input device such as a keyboard, mouse, pen, or trackball, a voice input device, a scanning device, or another device that provides input to the computing system 1300. For video encoding, the input device(s) 1314 may be a camera, video card, TV tuner card, or similar device that accepts video input in analog or digital form, or a CD-ROM or CD-RW that reads video samples into the computing system 1300. The output device(s) 1312 may be a display, printer, speaker, CD-writer, or another device that provides output from the computing system 1300.

The communication connection(s) 1316 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or another carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "computing device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A computerized method in which one or more processing devices perform operations comprising:
    displaying, in an interface of a graphics editing application:
        a target container having a boundary defined by a closed curve forming an asymmetrical shape;
        ornamental graphical elements;
    receiving, via the interface, a direction guide corresponding to the target container and indicating a desired directional flow of the ornamental graphical elements;
    generating a vector field within the target container that is a function of the direction guide;
    generating, in the vector field, a first streamline defined by a first set of streamline points placed on the direction guide;
    generating, in the vector field, a second streamline defined by a second set of streamline points placed on one or more of (i) the boundary of the target container and (ii) at a specified distance from the first streamline;
    dividing the target container into placement areas based on the first and second streamlines, the placement areas specifying non-overlapping locations for the ornamental graphical elements within the boundary of the target container;
    matching a particular ornamental graphical element to a particular placement area, wherein said matching comprises:
        constructing an element shape descriptor for the particular ornamental graphical element,
        constructing an area shape descriptor for the particular placement area, and
        matching the particular ornamental graphical element to the particular placement area based on the element shape descriptor matching the area shape descriptor more closely than other area shape descriptors for other placement areas; and
    updating the interface by placing each ornamental graphical element in a respective placement area.

2. The computerized method of claim 1, further comprising generating a plurality of streamlines, which includes the first streamline and the second streamline, in the vector field as a function of a specified spacing among the plurality of streamlines, a maximum desired streamline length, and a minimum desired streamline length.

3. The computerized method of claim 2, wherein placing the particular ornamental graphical element in the particular placement area comprises:
    associating a spine with the particular ornamental graphical element;
    placing the spine upon a corresponding streamline from the plurality of streamlines;
    deforming the spine to match a path of the corresponding streamline; and
    deforming the particular ornamental graphical element according to the deformation of the spine.

4. The computerized method of claim 2, wherein placing the particular ornamental graphical element in the particular placement area comprises adjusting a size of the particular ornamental graphical element, wherein the particular ornamental graphical element with the adjusted size completely fits within boundaries of the matched placement area and does not overlap any other placed ornamental graphical element.

5. The computerized method of claim 1,
wherein constructing the element shape descriptor comprises:
associating a spine with the particular ornamental graphical element;
measuring, at a plurality of points on the spine, spine distances that the particular ornamental graphical element extends from the spine; and
normalizing the spine distances;
wherein constructing the area shape descriptor comprises:
measuring, at a plurality of points on a streamline associated with the particular placement area, streamline distances that the particular placement area extends from the streamline; and
normalizing the streamline distances.

6. The computerized method of claim 1, the operations further comprising stretching a streamline to cause ends of the streamline to extend to ends of the particular placement area matched to the particular ornamental graphical element.

7. The computerized method of claim 1, wherein placing each ornamental graphical element in the respective placement area comprises modifying shapes of a subset of the placed ornamental graphical elements in accordance with the direction guide such that uniformity of arrangement of the placed ornamental graphical elements is reduced.

8. The computerized method of claim 1, wherein placing each ornamental graphical element in the respective placement area comprises modifying shapes of a subset of the placed ornamental graphical elements in accordance with the direction guide such that a spacing of the placed ornamental graphical elements is reduced.

9. The computerized method of claim 1, wherein placing each ornamental graphical element in the respective placement area comprises modifying shapes of a subset of the placed ornamental graphical elements in accordance with the direction guide such that a variation in a spacing of the placed ornamental graphical elements is reduced.

10. The method of claim 1, wherein the particular ornamental graphical element is matched to the particular placement area based on a sum-of-squares distance between a perimeter of the particular ornamental graphical element and a perimeter of the particular placement area.

11. The method of claim 1, wherein:
constructing the element shape descriptor for the particular ornamental graphical element comprises:
associating a spine with the particular ornamental graphical element,
sampling points along the spine,
computing a first set of left values, wherein each left value in the first set of left values identifies a respective distance between a left edge of the particular ornamental graphical element and a respective one of the points along the spine,
computing a first set of right values, wherein each right value in the first set of right values identifies a respective distance between a right edge of the particular ornamental graphical element and a respective one of the points along the spine, and
selecting, as the element shape descriptor, the first set of left values and the first set of right values; and
constructing the area shape descriptor for the particular placement area comprises:

identifying a placement area boundary of the particular placement area, wherein a particular streamline is enclosed by the placement area boundary,
computing a second set of left values, wherein each left value in the second set of left values identifies a respective length between a left edge of the placement area boundary and the particular streamline,
computing a second set of right values, wherein each right value in the second set of right values identifies a respective length between a right edge of the placement area boundary and the particular streamline,
selecting, as the area shape descriptor, the second set of left values and the second set of right values.

12. The method of claim 11, wherein the placement area boundary is computed based on the particular streamline and a Voronoi diagram that partitions the target container, wherein each length between the left edge of the placement area boundary and the particular streamline is computed for a respective left-extending normal to the particular streamline, wherein each length between the right edge of the placement area boundary and the particular streamline is computed for a respective right-extending normal to the particular streamline.

13. The method of claim 11, wherein matching the particular ornamental graphical element to the particular placement area comprises determining that a computation of a sum-of-squares distance with the element shape descriptor is smaller than computations of a sum-of-squares distance with other element shape descriptors for other ornamental graphical elements,
wherein the computation of a sum-of-squares distance with the element shape descriptor comprises summing (i) a set of squared differences between the first set of left values and the second set of left values and (ii) a set of squared differences between the first set of right values and the second set of right values.

14. A computing system comprising:
processing hardware; and
one or more memory devices communicatively coupled to the processing hardware and storing instructions,
wherein the processing hardware is configured for executing the instructions and thereby perform operations comprising:
displaying, in an interface of a graphics editing application (i) a target container having a boundary defined by a closed curve forming an asymmetrical shape and (ii) ornamental graphical elements,
receiving, via the interface, a direction guide corresponding to the target container and indicating a desired directional flow of the ornamental graphical elements,
generating a vector field within the target container that is a function of the direction guide,
generating a plurality of streamlines in the vector field as a function of a specified spacing among the plurality of streamlines and a maximum or minimum desired streamline length, wherein a first streamline is placed on the direction guide and a second streamline is placed on one or more of (i) the boundary of the target container and (ii) at a specified distance from the first streamline,
dividing the target container into placement areas based on the first and second streamlines, the placement areas specifying non-overlapping locations for the ornamental graphical elements within the boundary of the target container, matching a particular ornamental graphical element to a particular placement area, wherein said matching comprises:
(i) constructing an element shape descriptor for the particular ornamental graphical element,
(ii) constructing an area shape descriptor for the particular placement area, and
(iii) matching the particular ornamental graphical element to the particular placement area based on the element shape descriptor matching the area shape descriptor more closely than other area shape descriptors for other placement areas; and
updating the interface by placing each ornamental graphical element in a respective placement area.

15. The computing system of claim 14, wherein placing the particular ornamental graphical element in the particular placement area comprises:
associating a spine with the particular ornamental graphical element;
placing the spine upon a corresponding streamline from the plurality of streamlines;
deforming the spine to match a path of the corresponding streamline; and
deforming the particular ornamental graphical element according to the deformation of the spine.

16. The computing system of claim 14, wherein placing the particular ornamental graphical element in the particular placement area comprises adjusting a size of the particular ornamental graphical element, wherein the particular ornamental graphical element with the adjusted size completely fits within boundaries of the matched placement area and does not overlap any other placed ornamental graphical element.

17. The computing system of claim 14, wherein constructing the element shape descriptor comprises:
associating a spine with the particular ornamental graphical element;
measuring, at a plurality of points on the spine, spine distances that the particular ornamental graphical element extends from the spine; and
normalizing the spine distances;
wherein constructing the area shape descriptor comprises:
measuring, at a plurality of points on a streamline associated with the particular placement area, streamline distances that the particular placement area extends from the streamline; and
normalizing the streamline distances.

18. The computing system of claim 14, wherein placing each ornamental graphical element in the respective placement area comprises modifying shapes of a subset of the placed ornamental graphical elements in accordance with the direction guide such that one or more of:
a uniformity of arrangement of the placed ornamental graphical elements is reduced,
a spacing of the placed ornamental graphical elements is reduced, and
a variation in the spacing of the placed ornamental graphical elements is reduced.

19. A non-transitory computer-readable medium storing executable program instructions that, when executed by processing hardware, configures the processing hardware to perform operations comprising:
displaying, in an interface of a graphics editing application:
a target container having a boundary defined by a closed curve forming an asymmetrical shape;
ornamental graphical elements;
receiving, via the interface, a direction guide corresponding to the target container and indicating a desired directional flow of the ornamental graphical elements;
generating a vector field within the target container that is a function of the direction guide;
generating a first streamline defined by a first set of streamline points placed on the direction guide;
generating a second streamline defined by a second set of streamline points placed on one or more of (i) the boundary of the target container and (ii) at a specified distance from the first streamline;
dividing the target container into placement areas based on the first and second streamlines, the placement areas specifying non-overlapping locations for the ornamental graphical elements within the boundary of the target container;
matching a particular ornamental graphical element to a particular placement area, wherein said matching comprises:
constructing an element shape descriptor for the particular ornamental graphical element,
constructing an area shape descriptor for the particular placement area, and
matching the particular ornamental graphical element to the particular placement area based on the element shape descriptor matching the area shape descriptor more closely than other area shape descriptors for other placement areas; and
updating the interface by placing each ornamental graphical element in a respective placement area.

20. The non-transitory computer-readable medium of claim 19,
wherein constructing the element shape descriptor comprises:
associating a spine with the particular ornamental graphical element;
measuring, at a plurality of points on the spine, spine distances that the particular ornamental graphical element extends from the spine; and
normalizing the spine distances;
wherein constructing the area shape descriptor comprises:
measuring, at a plurality of points on a streamline associated with the particular placement area, streamline distances that the particular placement area extends from the streamline; and
normalizing the streamline distances.

* * * * *